United States Patent
Gagliano et al.

(10) Patent No.: US 7,637,239 B2
(45) Date of Patent: Dec. 29, 2009

(54) METHOD AND APPARATUS FOR ENHANCING THE EFFICIENCY OF OPERATION OF AN INTERNAL COMBUSTION ENGINE

(75) Inventors: Howard E. Gagliano, Kingston, TN (US); Marion M. Satterfield, Oak Ridge, TN (US)

(73) Assignee: Econo Plug Technologies, Inc., Kingston, TN (US)

( * ) Notice: Subject to any disclaimer, the term of this patent is extended or adjusted under 35 U.S.C. 154(b) by 0 days.

(21) Appl. No.: 12/031,229

(22) Filed: Feb. 14, 2008

(65) Prior Publication Data
US 2008/0168963 A1    Jul. 17, 2008

Related U.S. Application Data

(63) Continuation-in-part of application No. 11/689,852, filed on Mar. 22, 2007, now abandoned, which is a continuation-in-part of application No. 11/622,801, filed on Jan. 12, 2007, now abandoned.

(51) Int. Cl.
*F02B 19/00* (2006.01)
*F02B 19/02* (2006.01)

(52) U.S. Cl. .................................. 123/169 PA; 123/266
(58) Field of Classification Search ........... 123/169 PA, 123/266, 470, 293, 260, 169 R, 169 C, 143 R, 123/146.5 R; 313/143
See application file for complete search history.

(56) References Cited

U.S. PATENT DOCUMENTS

| | | | |
|---|---|---|---|
| 2,127,512 A | 8/1938 | Harper, Jr. | |
| 3,665,902 A | 5/1972 | Bloomfield | |
| 4,092,969 A | 6/1978 | Ono et al. | |
| 4,175,501 A | 11/1979 | Noguchi et al. | |
| 4,218,993 A | 8/1980 | Blackburn | |
| 4,242,990 A | 1/1981 | Scherenberg et al. | |
| 4,442,807 A * | 4/1984 | Latsch et al. | 123/263 |
| 4,646,695 A | 3/1987 | Blackburn | |
| 4,696,269 A | 9/1987 | Blackburn | |
| 5,554,908 A | 9/1996 | Kuhnert et al. | |
| 6,216,669 B1 | 4/2001 | Aoki | |
| 7,066,137 B1 | 6/2006 | Dawson | |
| 7,104,246 B1 | 9/2006 | Galiano et al. | |
| 2003/0213461 A1 * | 11/2003 | Regueiro | 123/262 |

* cited by examiner

Primary Examiner—Mahmoud Gimie
(74) Attorney, Agent, or Firm—Pitts & Brittian, PC (57) ABSTRACT

Method and apparatus useful in simultaneously enhancing the fuel consumption efficiency of an ICE, with concomitant enhancement of the power delivered by the engine, and reduction of undesirable exhaust emissions. One embodiment of the method of this invention includes the steps of introducing a fuel/air mixture to the main combustion chamber of the ICE, providing a flame front pre-combustion system which enhances the timely delivery of multiple flame fronts to specific locations within the main combustion chamber for substantial spontaneity of ignition and combustion of the fuel/air mixture disposed within the combustion chamber when the crankshaft is within about 5 degrees nearer top dead center (TDC) than the timing established by a standard operation map for the ICE in question and which employs a conventional spark plug disposed within the combustion chamber. Such combustion continues over that time period during which the crankshaft travels at least past TDC and into its power stroke.

12 Claims, 10 Drawing Sheets

Standard Spark Plugs

| Air Flow in Grams per Cylinder | 400 | 600 | 800 | 1000 | 1200 | 1400 | 1600 | 1800 | 2000 | 2200 | 2400 | 2800 | 3200 | 3600 | 4000 |
|---|---|---|---|---|---|---|---|---|---|---|---|---|---|---|---|
| 0.08 | 18.0 | 18.0 | 30.0 | 40.0 | 46.5 | 50.0 | 50.0 | 50.0 | 50.0 | 50.0 | 50.0 | 50.0 | 50.0 | 50.0 | 50.0 |
| 0.12 | 18.0 | 18.0 | 26.3 | 39.1 | 47.1 | 50.0 | 50.0 | 50.0 | 50.0 | 50.0 | 50.0 | 50.0 | 50.0 | 50.0 | 49.6 |
| 0.16 | 18.0 | 18.0 | 23.5 | 37.6 | 44.8 | 45.7 | 46.3 | 47.1 | 47.5 | 48.0 | 48.7 | 48.2 | 47.4 | 46.7 | 45.6 |
| 0.20 | 18.0 | 18.0 | 23.0 | 34.3 | 39.0 | 40.3 | 41.2 | 42.0 | 42.4 | 43.2 | 42.9 | 42.6 | 42.5 | 42.0 | 41.4 |
| 0.24 | 18.0 | 18.0 | 23.4 | 31.4 | 33.6 | 35.6 | 36.7 | 37.9 | 38.5 | 39.0 | 39.0 | 38.7 | 38.7 | 38.4 | 38.0 |
| 0.28 | 16.3 | 18.0 | 23.0 | 27.8 | 29.7 | 31.6 | 32.8 | 34.3 | 34.6 | 35.4 | 36.0 | 35.8 | 35.8 | 35.6 | 35.4 |
| 0.32 | 13.2 | 16.9 | 20.2 | 24.3 | 26.5 | 28.6 | 29.9 | 31.8 | 32.3 | 33.0 | 33.7 | 33.6 | 33.8 | 33.6 | 33.4 |
| 0.36 | 9.0 | 13.1 | 16.8 | 21.0 | 23.5 | 25.2 | 27.2 | 29.4 | 30.2 | 31.2 | 32.0 | 32.1 | 32.3 | 32.1 | 31.9 |
| 0.40 | 5.5 | 10.0 | 13.2 | 17.3 | 20.2 | 20.9 | 23.9 | 26.8 | 28.1 | 29.3 | 30.0 | 30.8 | 31.1 | 30.9 | 30.6 |
| 0.44 | 2.7 | 7.3 | 10.6 | 14.2 | 16.3 | 17.8 | 20.3 | 23.0 | 25.1 | 27.0 | 29.0 | 29.7 | 30.1 | 30.0 | 29.5 |
| 0.48 | 0.3 | 4.8 | 7.6 | 10.6 | 13.2 | 15.5 | 17.6 | 20.0 | 22.6 | 25.1 | 26.8 | 28.5 | 29.1 | 29.0 | 28.4 |
| 0.52 | -1.9 | 2.4 | 5.1 | 8.4 | 11.0 | 13.5 | 15.7 | 18.8 | 21.1 | 23.7 | 25.1 | 27.0 | 27.8 | 27.8 | 27.1 |
| 0.56 | -4.0 | 0.0 | 2.6 | 5.6 | 9.4 | 11.6 | 13.2 | 15.8 | 17.7 | 20.6 | 21.8 | 24.4 | 26.0 | 26.2 | 25.5 |
| 0.60 | -6.1 | -2.8 | -0.2 | 2.3 | 6.3 | 8.7 | 9.6 | 12.3 | 13.7 | 16.5 | 18.0 | 21.5 | 23.6 | 24.1 | 23.4 |
| 0.64 | -8.5 | -6.0 | -3.2 | -0.3 | 2.5 | 4.7 | 6.4 | 8.8 | 10.6 | 13.1 | 14.5 | 17.4 | 20.3 | 21.2 | 20.6 |
| 0.68 | -9.0 | -7.7 | -5.1 | -2.4 | -0.6 | 0.8 | 2.9 | 4.4 | 7.0 | 8.2 | 10.1 | 13.1 | 15.9 | 17.4 | 17.1 |
| 0.72 | -9.0 | -7.1 | -5.7 | -4.6 | -3.8 | -2.6 | -2.0 | 0.5 | 2.8 | 4.5 | 5.8 | 8.0 | 10.8 | 12.5 | 13.5 |
| 0.76 | -9.0 | -7.1 | -5.4 | -4.2 | -3.6 | -2.5 | -2.0 | -0.4 | 0.8 | 1.7 | 2.7 | 5.2 | 8.0 | 9.6 | 9.8 |
| 0.80 | -9.0 | -7.4 | -5.4 | -4.6 | -3.7 | -2.9 | -2.0 | -0.9 | 0.0 | 0.5 | 2.2 | 4.9 | 8.0 | 9.1 | 9.8 |
| 0.84 | -8.5 | -7.5 | -5.8 | -4.6 | -3.7 | -2.9 | -2.0 | -0.9 | 0.0 | 0.5 | 2.2 | 4.9 | 8.0 | 9.1 | 9.8 |
| 0.88 | -8.5 | -7.5 | -5.0 | -4.6 | -3.7 | -2.9 | -2.0 | -0.9 | 0.0 | 0.5 | 2.2 | 4.9 | 8.0 | 9.1 | 9.8 |
| 0.92 | -8.5 | -7.5 | -5.0 | -4.6 | -3.7 | -2.9 | -2.0 | -0.9 | 0.0 | 0.5 | 2.2 | 4.9 | 8.0 | 9.1 | 9.8 |
| 0.96 | -8.5 | -7.5 | -5.0 | -4.6 | -3.7 | -2.9 | -2.0 | -0.9 | 0.0 | 0.5 | 2.2 | 4.9 | 8.0 | 9.1 | 9.8 |
| 1.00 | -8.5 | -7.5 | -5.0 | -4.6 | -3.7 | -2.9 | -2.0 | -0.9 | 0.0 | 0.5 | 2.2 | 4.9 | 8.0 | 9.1 | 9.8 |

Engine RPM

Fig.12

Present Invention

| Air Flow in Grams per Cylinder | 400 | 600 | 800 | 1000 | 1200 | 1400 | 1600 | 1800 | 2000 | 2200 | 2400 | 2800 | 3200 | 3600 | 4000 |
|---|---|---|---|---|---|---|---|---|---|---|---|---|---|---|---|
| 0.08 | 13.0 | 13.0 | 23.0 | 24.0 | 28.5 | 29.0 | 29.0 | 31.0 | 31.0 | 39.0 | 39.0 | 39.0 | 39.0 | 39.0 | 39.0 |
| 0.12 | 13.0 | 13.0 | 21.3 | 24.1 | 30.1 | 30.0 | 30.0 | 32.0 | 32.0 | 39.0 | 39.0 | 39.0 | 39.0 | 39.0 | 39.0 |
| 0.16 | 13.0 | 13.0 | 18.5 | 23.6 | 28.8 | 29.7 | 30.3 | 33.1 | 33.0 | 39.0 | 39.0 | 39.0 | 39.4 | 38.7 | 37.7 |
| 0.20 | 13.0 | 13.0 | 18.0 | 22.3 | 27.0 | 28.3 | 29.2 | 30.0 | 30.4 | 36.2 | 35.9 | 35.6 | 35.5 | 35.0 | 34.4 |
| 0.24 | 13.0 | 13.0 | 18.4 | 26.4 | 28.6 | 30.6 | 31.7 | 32.9 | 33.5 | 34.0 | 34.0 | 33.7 | 33.7 | 33.4 | 33.0 |
| 0.28 | 11.3 | 13.0 | 18.0 | 22.8 | 24.7 | 26.6 | 27.8 | 29.3 | 29.6 | 30.4 | 31.0 | 30.8 | 30.8 | 30.6 | 30.4 |
| 0.32 | 8.2 | 11.9 | 15.2 | 19.3 | 21.5 | 23.6 | 24.9 | 26.8 | 27.3 | 28.0 | 28.7 | 28.7 | 28.7 | 28.6 | 28.4 |
| 0.36 | 4.0 | 8.1 | 11.8 | 16.0 | 18.5 | 20.2 | 22.2 | 24.4 | 25.2 | 26.2 | 27.0 | 27.1 | 27.3 | 27.1 | 26.9 |
| 0.40 | 0.5 | 5.0 | 8.2 | 12.3 | 15.2 | 15.9 | 18.9 | 21.8 | 23.1 | 24.3 | 25.0 | 25.8 | 26.1 | 25.9 | 25.6 |
| 0.44 | -2.3 | 2.2 | 5.6 | 9.2 | 11.3 | 12.8 | 15.3 | 18.0 | 20.1 | 22.0 | 24.0 | 24.7 | 25.1 | 25.0 | 24.5 |
| 0.48 | -4.7 | -0.2 | 2.6 | 5.6 | 8.2 | 10.5 | 12.6 | 15.0 | 17.6 | 20.1 | 21.8 | 23.5 | 24.1 | 24.0 | 23.4 |
| 0.52 | -6.9 | -2.6 | 0.1 | 3.4 | 6.0 | 8.5 | 10.7 | 13.8 | 16.1 | 18.7 | 20.1 | 22.0 | 22.8 | 22.8 | 22.1 |
| 0.56 | -9.0 | -5.1 | -2.4 | 0.6 | 4.4 | 6.6 | 8.2 | 10.8 | 12.7 | 15.6 | 16.8 | 19.4 | 21.0 | 21.2 | 20.5 |
| 0.60 | -11.1 | -7.8 | -5.2 | -2.7 | 1.3 | 3.7 | 4.6 | 7.3 | 8.7 | 11.5 | 13.0 | 16.5 | 18.6 | 19.1 | 18.4 |
| 0.64 | -13.5 | -11.0 | -8.2 | -5.3 | -2.5 | -0.3 | 1.4 | 3.8 | 5.6 | 8.0 | 9.5 | 12.4 | 15.3 | 16.2 | 15.6 |
| 0.68 | -14.0 | -12.7 | -10.1 | -7.4 | -5.6 | -4.2 | -2.1 | -0.6 | 2.0 | 3.2 | 5.1 | 8.0 | 10.9 | 12.4 | 12.1 |
| 0.72 | -14.0 | -12.1 | -10.7 | -9.6 | -8.8 | -7.6 | -7.0 | -4.5 | -2.2 | -0.5 | 0.8 | 3.0 | 5.8 | 7.5 | 8.5 |
| 0.76 | -14.0 | -12.1 | -10.4 | -9.2 | -8.6 | -7.5 | -7.0 | -5.4 | -4.2 | -3.3 | -2.3 | 0.2 | 3.0 | 4.6 | 4.8 |
| 0.80 | -14.0 | -12.4 | -10.4 | -9.6 | -8.7 | -7.9 | -7.0 | -5.9 | -5.0 | -4.5 | -2.8 | -0.1 | 3.0 | 4.1 | 4.8 |
| 0.84 | -13.5 | -12.5 | -10.8 | -9.6 | -8.7 | -7.9 | -7.0 | -5.9 | -5.0 | -4.5 | -2.8 | -0.1 | 3.0 | 4.1 | 4.8 |
| 0.88 | -13.5 | -12.5 | -10.0 | -9.6 | -8.7 | -7.9 | -7.0 | -5.9 | -5.0 | -4.5 | -2.8 | -0.1 | 3.0 | 4.1 | 4.8 |
| 0.92 | -13.5 | -12.5 | -10.0 | -9.6 | -8.7 | -7.9 | -7.0 | -5.9 | -5.0 | -4.5 | -2.8 | -0.1 | 3.0 | 4.1 | 4.8 |
| 0.96 | -13.5 | -12.5 | -10.0 | -9.6 | -8.7 | -7.9 | -7.0 | -5.9 | -5.0 | -4.5 | -2.8 | -0.1 | 3.0 | 4.1 | 4.8 |
| 1.00 | -13.5 | -12.5 | -10.0 | -9.6 | -8.7 | -7.9 | -7.0 | -5.9 | -5.0 | -4.5 | -2.8 | -0.1 | 3.0 | 4.1 | 4.8 |

Engine RPM

Fig.13

Difference Between Standard Spark Plug and Present Invention
A negative number means closer to TDC Engine RPM

| Air Flow in Grams per Cylinder | 400 | 600 | 800 | 1000 | 1200 | 1400 | 1600 | 1800 | 2000 | 2200 | 2400 | 2800 | 3200 | 3600 | 4000 |
|---|---|---|---|---|---|---|---|---|---|---|---|---|---|---|---|
| 0.08 | -5.0 | -5.0 | -7.0 | -16.0 | -18.0 | -21.0 | -21.0 | -19.0 | -19.0 | -11.0 | -11.0 | -11.0 | -11.0 | -11.0 | -11.0 |
| 0.12 | -5.0 | -5.0 | -5.0 | -15.0 | -17.0 | -20.0 | -20.0 | -18.0 | -18.0 | -11.0 | -11.0 | -11.0 | -11.0 | -11.0 | -10.6 |
| 0.16 | -5.0 | -5.0 | -5.0 | -14.0 | -16.0 | -16.0 | -16.0 | -14.0 | -14.5 | -9.0 | -9.7 | -9.2 | -8.0 | -8.0 | -8.0 |
| 0.20 | -5.0 | -5.0 | -5.0 | -12.0 | -12.0 | -12.0 | -12.0 | -12.0 | -12.0 | -7.0 | -7.0 | -7.0 | -7.0 | -7.0 | -7.0 |
| 0.24 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.28 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.32 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.36 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.40 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.44 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.48 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.52 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.56 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.60 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.64 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.68 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.72 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.76 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.80 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.84 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.88 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.92 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 0.96 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |
| 1.00 | -5.0 | -5.0 | -5.0 | -5.0 | -5.0 | -5.0 | -5.0 | -5.0 | -5.0 | -5.0 | -5.0 | -5.0 | -5.0 | -5.0 | -5.0 |

Fig.14

METHOD AND APPARATUS FOR ENHANCING THE EFFICIENCY OF OPERATION OF AN INTERNAL COMBUSTION ENGINE

CROSS-REFERENCE TO RELATED APPLICATIONS

This application is a continuation-in-part application of co-pending U.S. patent application Ser. No. 11/689,852, filed Mar. 22, 2007, entitled: Ignition System for Internal Combustion Engine, which is a continuation-in-part of co-pending U.S. patent application Ser. No. 11/622,801, filed Jan. 12, 2007, entitled: Spark Ignition Modifier Module And Method, the whole of each of which is incorporated herein by reference and upon which priority is claimed.

STATEMENT REGARDING FEDERALLY SPONSORED RESEARCH OR DEVELOPMENT

Not Applicable

FIELD OF INVENTION

This invention relates to internal combustion engines, such as are commonly used for propelling motor vehicles.

BACKGROUND OF INVENTION

Internal combustion engines (ICE), in particular the well-known Otto-cycle or "four stroke" engine) are fueled with a combustible mixture of fuel (e.g. gasoline) and air. Perhaps two of the most undesirable characteristics of an ICE are the relatively low efficiency and relatively high contaminant emission exhibited by these engines. This inefficient utilization of the fuel, detracts from control of engine power output, and undesirable, and even harmful emissions.

For purposes of the present disclosure, the four strokes of the engine comprise an intake stroke, a compression stroke, a power stroke and an exhaust stroke. The cycle begins when the piston of the engine is at top dead center (TDC). Herein, the four stroke cycle is deemed to commence when the rotational position of the crankshaft (which moves with the piston through its strokes) is such that the piston is at TDC. All references to rotational positions of the piston are based upon the degrees of rotation of the crankshaft from the starting TDC of the piston. For example, 10 degrees before TDC refers to the rotational position of the crankshaft being 10 degrees before the commencement of a power stroke of the engine cycle.

Probably, the most common of the many attempts of prior art devices and methods for attacking the problems associated with ICEs is utilization of a flame front initiated outside the normal combustion chamber of an ICE and thereafter propagated into the main combustion chamber wherein such flame front ignites the usual charge of air/fuel mixture (herein at times A/F or A/F mixture) disposed within the combustion chamber. Whereas some of these attempts have achieved at least limited desired results, none of such attempts are known to have economically or otherwise effectively provided both the sought after increase in efficiency and simultaneous reduction of environmentally unfriendly exhaust emissions associated with ICEs.

Currently, in the ICE industry, there are two aspects of the industry which in part tend to require different possible means for enhancement of the efficiency of the ICE plus minimization of the exhaust emissions from the engine. The first such aspect relates to the number of ICEs currently in use and which employ carburetor systems and the second aspect relates to the more recent and currently expanding market for ICEs employing engine control modules (ECM) (which control spark timing, fuel injection, etc).

In the prior art the concept of employing flame front(s) initiated externally of the main combustion chamber and propagated into the main combustion chamber, for ignition of the air/fuel mixture within the main combustion chamber has been somewhat heavily pursued. This concept is more or less compatible with either carburetor or fuel injection systems, but its uses are expanding primarily into those engines employing fuel injection for introduction of a quantity of a air/fuel mixture into the engine combustion chamber once per cycle of the engine through its intake stroke, compression stroke, power stroke and exhaust stroke of the piston.

In those ICEs which employ a carburetor for the introduction of an A/F mixture into the combustion chamber of the engine, the A/F mixture disposed within the combustion chamber is ignited by means of a spark plug which projects into the combustion chamber. It has been proposed in the prior art to employ a relatively lean A/F mixture as an aid toward reduction of undesirable emission products. Heretofore, mere incorporation of a flame front pre-combustion system in a carburetored ICE has failed to be economically, operationally or otherwise suitably beneficial.

ICEs which are controlled by an ECM, for example, commonly utilize stoichiometric A/F mixtures for enhanced utilization of the fuel employed to operate the engine. These EMC controlled systems tend to generate excessive nitrogen-containing emission products. The well-known "three-way catalyst" system has been found effective to preclude such nitrogen-containing emission products from entering the atmosphere; however, this catalyst system is ineffective in combination with carburetored ICEs.

air/fuel mixture is one of the more important principles of internal combustion engine operation. For gasoline, the stoichiometric air/fuel ratio is 14.7:1. That is, 1 unit of fuel mass is consumed for every 14.7 units of air mass that are drawn into the engine. The stoichiometric is neither most fuel efficient nor delivers the most power, it is a compromise.

The stoichiometric ratio usually is the least polluting, because the catalytic converter can most easily remove pollutants at such a ratio. The stoichmetric mode is most often used during cruising and light acceleration.

For optimum power, a 12.7:1 (slightly fuel-rich) air/fuel ratio should be used. However, it is not very fuel efficient, it can foul spark plugs, and is polluting (the catalytic converter is outside its optimum range, and very polluting unburned hydrocarbons are released). Modern cars usually only use this mode (called fuel enrichment mode) under hard acceleration.

For maximum fuel economy, a 16.1 (fuel-lean) air/fuel ratio should be used. However, the lack of extra fuel to cool the engine results in hot, less dense intake air, reducing power. Also, the extra heat puts stress on engine parts, and increases octane requirement. Although less polluting than fuel-rich, fuel-lean produces large amounts of nitrogen oxides, as well as putting the catalytic converter out of its range. Lean mixtures are generally not used on modern, pollution-controlled vehicles.

These factors have led to the practice of developing an Electronic Control Module for internal combustion engines wherein various operational factors of the engine are monitored and employed to provide to the IEC the most fuel efficient, minimum contaminating and otherwise desirable air/fuel ratio which provides the maximum torque at any one of a range of engine rpms which are representative of the anticipated operating conditions of the engine (e.g. low rpms at idle speeds to high rpms at higher or more torque-demanding operating conditions.) This concept "torque control" has led to the use of operation maps developed for a given engine. Such maps take into consideration the timing of the initiation of the spark ignition of the air/fuel mixture disposed within the combustion chamber of the engine (before TDC of the crankshaft) as will maximize the torque developed at any given combination of air/fuel intake at any given rpm of the engine. That is, these maps are based upon torque output values. Inasmuch as the torque values desired at different rpms of the engine, the timing of the ignition of the combustion of the air/fuel mixture varies considerably between idle speeds and higher rpm speeds. Such maps are developed for a given engine employing a very large number of test runs of the engine at each combination of rpms and air flow into the combustion chamber of the engine. These maps, therefore, are specific for a given engine. Most commonly the operational map for a given engine is available from the manufacturer of the engine. However, one skilled in the art can develop an operational map for a given engine by following the multiple testing procedures referred to above. These operational maps have generally become the "standard" for ICEs, particularly where the ICE is controlled by an ECM.

The present inventor has found, however, that enhancement of the efficiency of multiple aspects of the operation of an ICE, whether controlled by an ECM or a carburetor, can be materially enhanced. In accordance with the present invention, such enhancement is accomplished through the use of a flame front type pre-combustion system which effects commencement of the ignition of the fuel/air mixture disposed within the combustion chamber of an ICE at a time which is about 5 degrees later than the ignition time dictated by a prior art operational map. This retardation of the timing of ignition of the fuel/air mixture has been found possible over substantially all anticipated combinations of engine speed and rate of air flow into the combustion chamber of the engine. In certain combinations of engine speed and the lower air flow rates, the retardation of the timing may exceed 5 degrees, thereby further enhancing the efficiency of operation of the engine at such lower speed and air flow rate combinations.

SUMMARY OF INVENTION

In accordance with one aspect of the present invention, the inventor has discovered a method and apparatus useful in simultaneously enhancing the fuel consumption efficiency of an ICE, with concomitant enhancement of the power delivered by the engine and acceptable exhaust emissions. One embodiment of the method of this invention includes the steps of introducing a air/fuel mixture to the main combustion chamber of an ICE, providing a flame front pre.-combustion system disposed externally of the combustion chamber and which enhances the timely delivery of multiple flame fronts to specific locations within the main combustion chamber for substantial spontaneity of ignition and combustion of different portions of the air/fuel mixture disposed within the combustion chamber when the crankshaft is within about 5 degrees nearer top dead center (TDC) than the timing established by a standard operation map for the ICE in question and which employs a conventional spark plug disposed within the combustion chamber of the ICE. Such combustion continues over that time period during which the piston associated with the crankshaft travels from about 5 degrees before TDC, past TDC and at least partly through the engine power stroke. In the present invention, the propagation of the ignited A/F mixture within the combustion chamber maximizes the rate of buildup of heat and pressure within the combustion chamber at a time when the rotational position of the crankshaft, hence the position of the piston within the engine cylinder, is substantially at TDC, thereby maximizing the timing of the application of energy to the piston, thence to the crankshaft, with concomitant advantages.

BRIEF DESCRIPTION OF THE FIGURES

FIG. 12 is an operation map of a typical ICE (without a flame front pre-combustion system) supplied by the manufacturer of the ICE;

FIG. 13 is an operation map of the ICE of FIG. 12, and including a flame front system of the present invention; and, FIG. 14 is a tabular representation of the differences in timing of commencement of combustion between the operation maps of FIGS. 12 and 13.

DETAILED DESCRIPTION OF INVENTION

Figure 1:
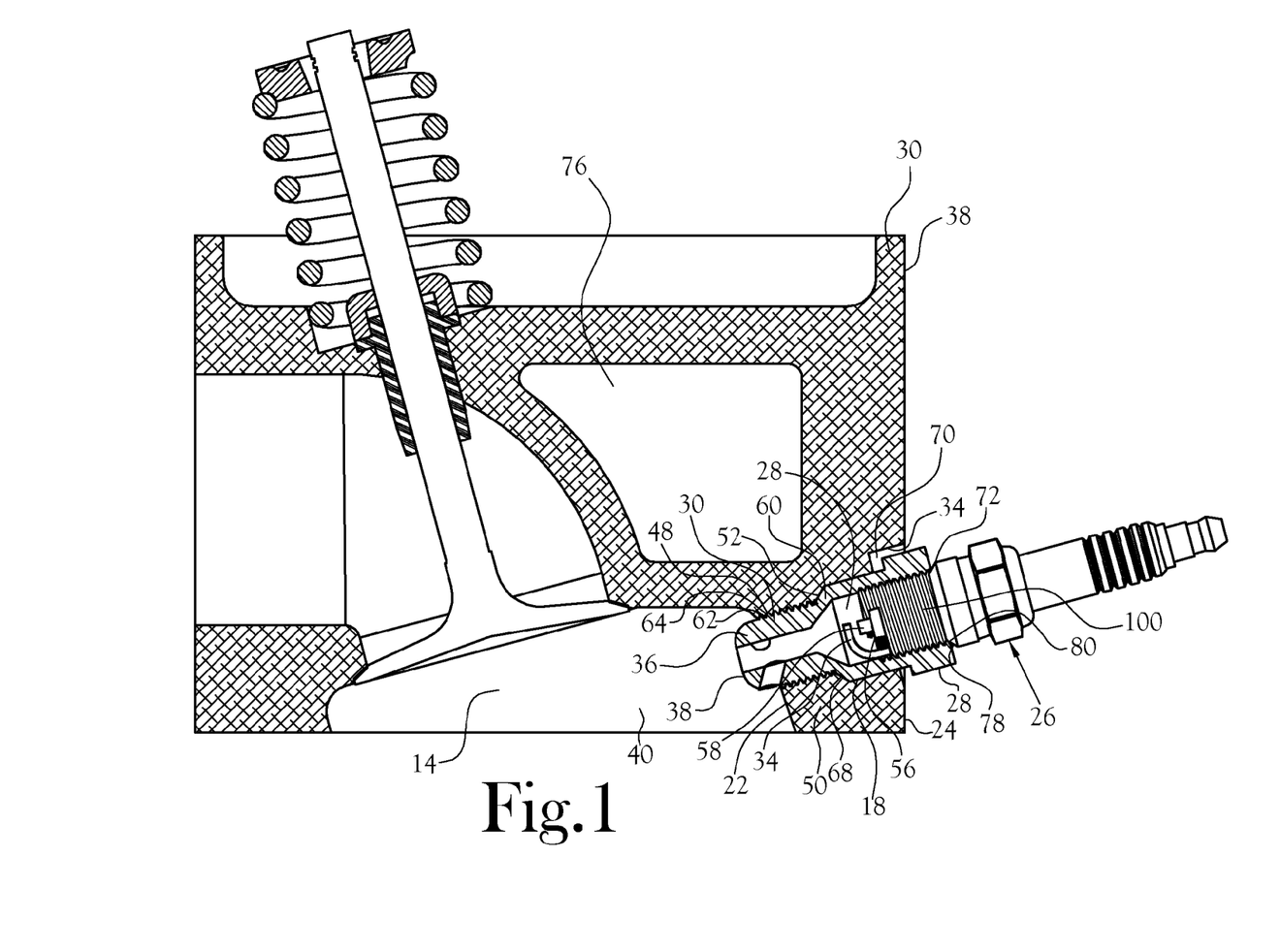
FIG. 1 is a schematic representation of one embodiment of apparatus embodying various of the features of the present invention.

The present invention relates to an ICE. Referring to FIGS. 1 and 12, a conventional ICE 10 includes a piston 12 reciprocatably mounted within a cylinder 14. A connecting rod connects the piston with a crankshaft whose rotation transfers power to the drive train of a motor vehicle. Referring to FIG. 1, the cylinder opens into a combustion chamber 20 within which a air/fuel mixture (at times "A/F") is ignited by a spark plug 44 and burned to develop pressure and heat effective to drive the piston within its cylinder, hence effect rotation of the crankshaft. Within the combustion chamber there is included an intake valve 22 through which "fresh" A/F is admitted to the combustion chamber and an exhaust valve 24 through which unburned (if any) A/F and emission products from the combustion of the F/A A/F are dispelled from the combustion chamber.

One embodiment of apparatus for carrying out the method of the present invention with an ICE is depicted in FIG. 1. In the depicted embodiment, there is provided a pre-combustion system 26 including a pre-combustion chamber 28 disposed externally of the main combustion chamber 20 of the engine (hereinafter the "combustion chamber"). This system further includes a generally hollow tubular flame cone 30 which is removably insertable into a first threaded portion 32 of a throughbore 34 which extends through the wall 36 of the head 38 of the internal combustion engine and terminates within the combustion chamber. In this embodiment, the flame cone occupies that portion 32 of the throughbore which is nearest the combustion chamber. That end 40 of the flame cone which is most external of the combustion chamber (yet within the throughbore) threadably receives therein the electrode end 42 of a common spark plug 44. The combination of the electrode end of the spark plug and a portion 46 of the inner wall of the flame cone define the pre-combustion chamber 28 at a location about midway between the opposite ends of the throughbore, but in any event, fully within the throughbore.

Further, in the depicted embodiment, the flame cone is provided with a central first channel 48 which provides for fluid communication between the pre-combustion chamber and the combustion chamber. Proximate the inboard terminal end 50 of the flame cone, there is provided a plurality of, commonly at least one, lateral channel 52 which extends generally laterally from the central channel at a location about the outer periphery of the central channel and which is spaced apart from the central channel. This lateral channel functions to divide a portion of a flame front moving through the central channel into a laterally directed flame front entering the combustion chamber at a spaced apart location relative to the location of entry of the flame front exiting the central channel and entering the combustion chamber.

In this embodiment, (see FIGS. 1 and 2) the inboard terminal end of the flame cone extends into the combustion chamber to the limited extent that the exit end of the central channel and the exit port 56 of the at least one lateral channel 52 may directionally introduce respective flame fronts 58, 60 into the combustion chamber without material interference with the propagation of the flame fronts by the structure of the combustion chamber or other element disposed within the combustion chamber. Each of these flame fronts constitutes a source of ignition for preselected portions of a fuel/air mixture disposed at different locations within the combustion chamber.

Figure 2:
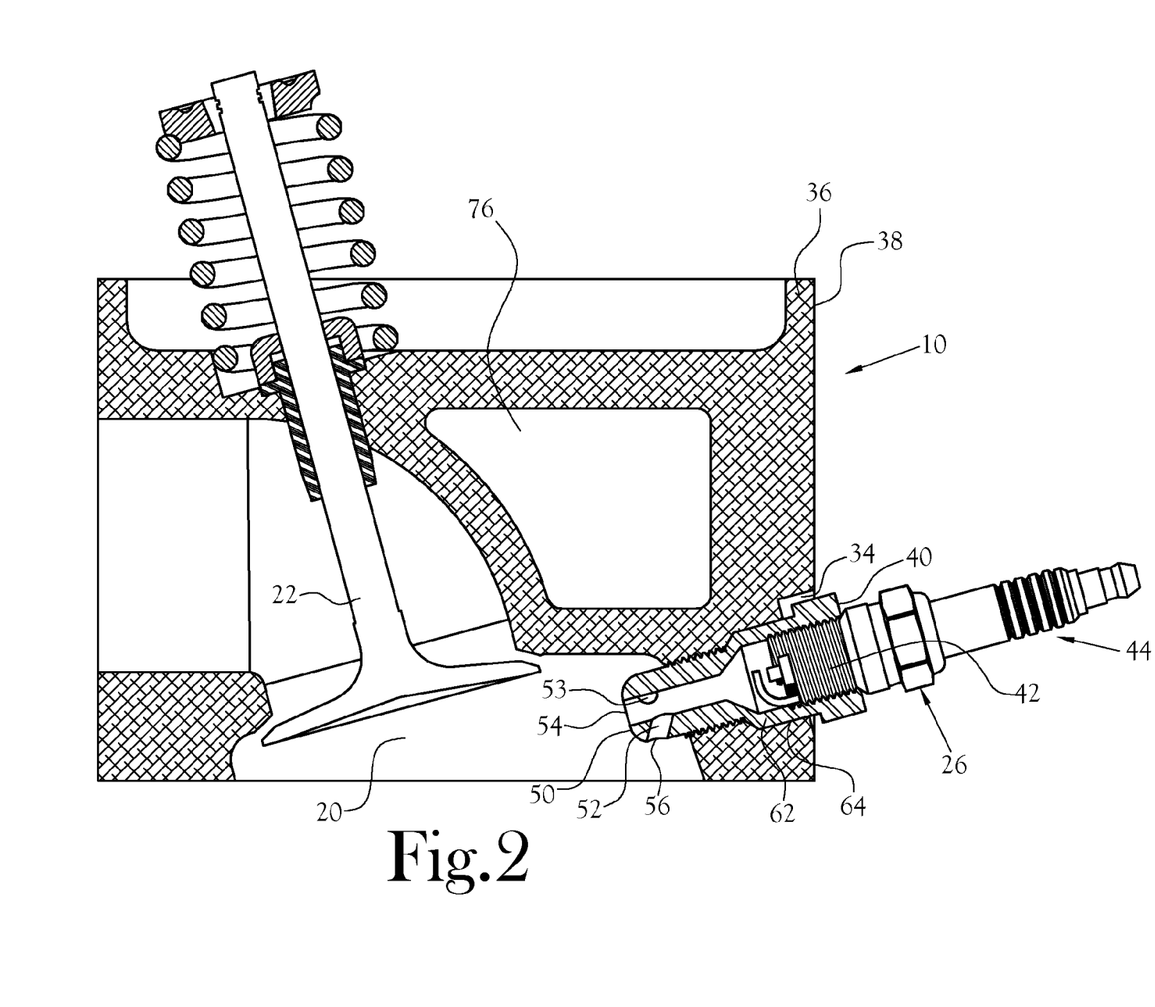
FIG. 2 is a schematic representation of a further embodiment of apparatus embodying various of the features of the present invention.

In a preferred embodiment, the central channel extends in direct, substantially unimpeded fluid flow communication between the pre-combustion chamber and the inboard terminal end of the flame cone. The depicted central channel preferably is of a hollow cylindrical geometry which preferably is substantially straight.

Further, as depicted in FIGS. 1 and 2, the outboard end of the throughbore through the wall of the engine head is enlarged to receive therein a first body portion 62 of the flame cone. This enlargement of the throughbore and the outer wall 64 of the outboard end of the first body portion of the flame cone are spaced apart to define an annular void space 70 therebetween. This annular space is selected to permit the receipt therewithin of a tool for grasping and rotationally screwing the flame cone into the throughbore.

Referring to FIG. 2, a stop in the form of an external circumferential slanted shoulder in the wall of the throughbore is provided for limiting location of the flame cone in the throughbore. The extent of insertion of the spark plug into the first body portion of the flame cone is similarly limited by means of a circumferential shoulder 74 defined internally of the flame cone. These stops may further serve to seal off selected interior areas of the apparatus from the environment external of the ICE.

As noted, the pre-combustion chamber is fully disposed within the throughbore through the head wall, and preferably approximately midway between the opposite ends of the throughbore through the engine head wall. The present inventor has found that, as so positioned, the pre-combustion chamber and a substantial portion of the central channel thereof, are sufficiently proximate to the existing cooling channel or channels 76 of the ICE as to provide cooling of the pre-combustion chamber and/or other portions of the flame cone and thereby preclude inordinate buildup of heat and possible inadvertent pre-ignition of any fuel/air mixture entering or resident within the pre-combustion chamber and/or the central channel.

Figure 3:
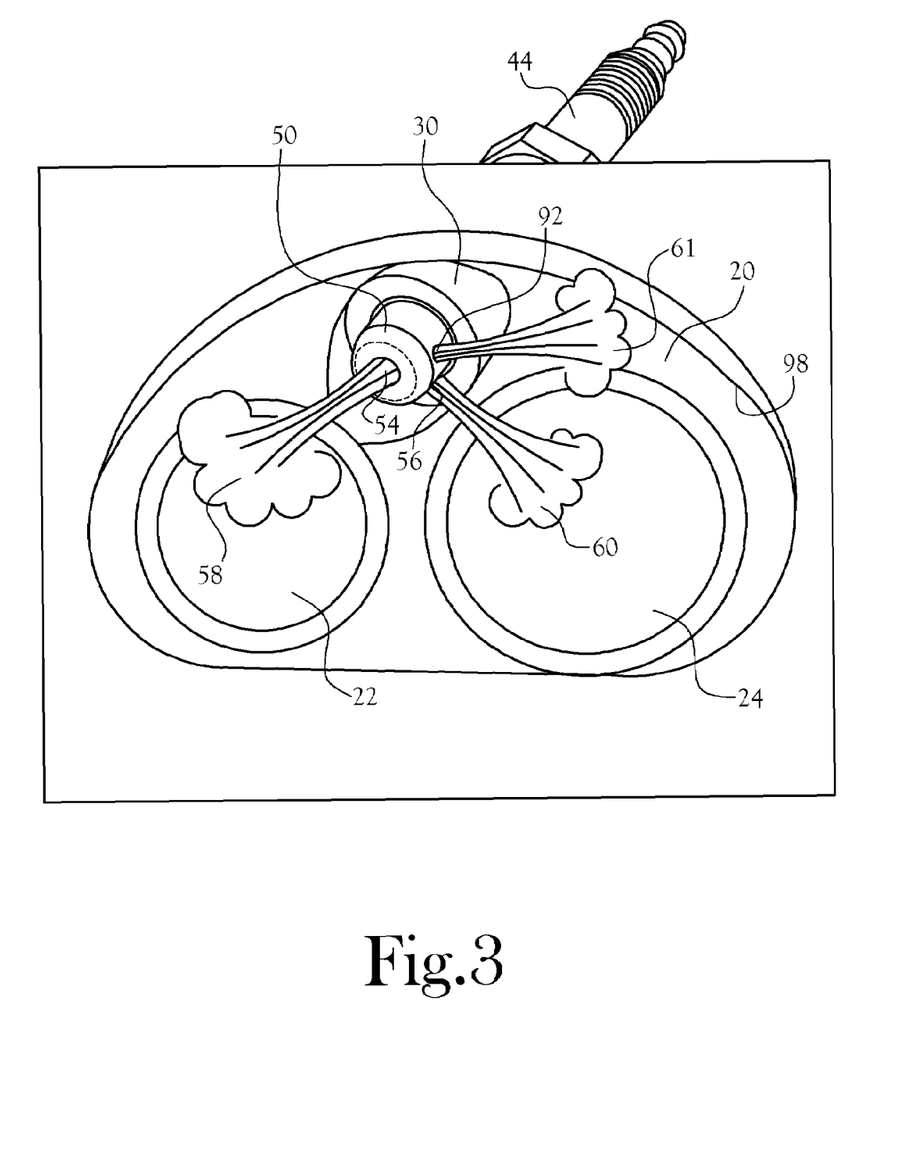
FIG. 3 is a schematic representation of one embodiment of the introduction of multiple flame fronts into a combustion chamber of an internal combustion engine employing the present invention.
Figures 4, 5:
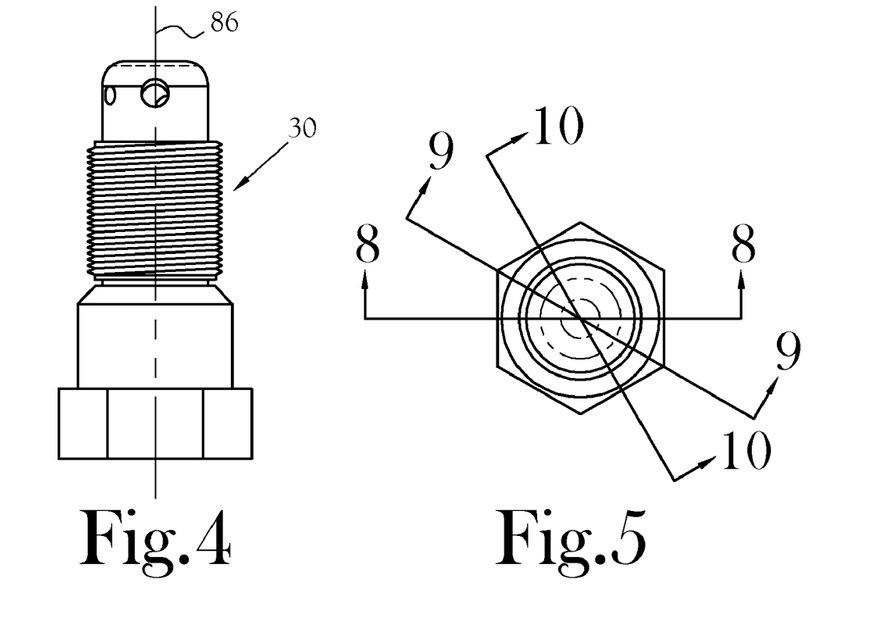
FIG. 4 is a side elevation view of one embodiment of a flame cone useful in the present invention.
FIG. 5 is a top end view of the flame cone depicted in FIG. 4.
Figure 6:
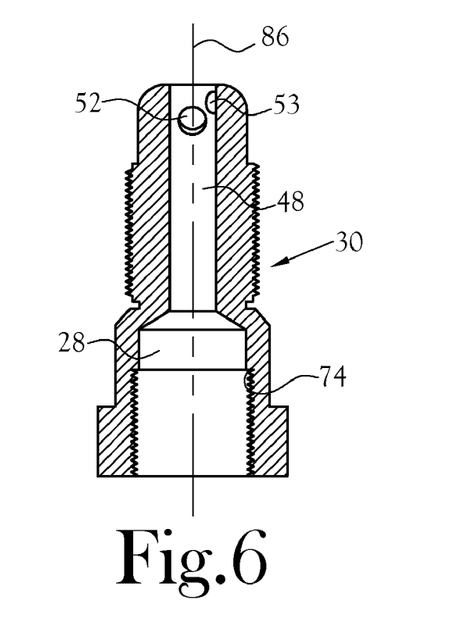
FIG. 6 is a side elevation view, in section of the flame cone depicted in FIG. 4.
Figure 7:
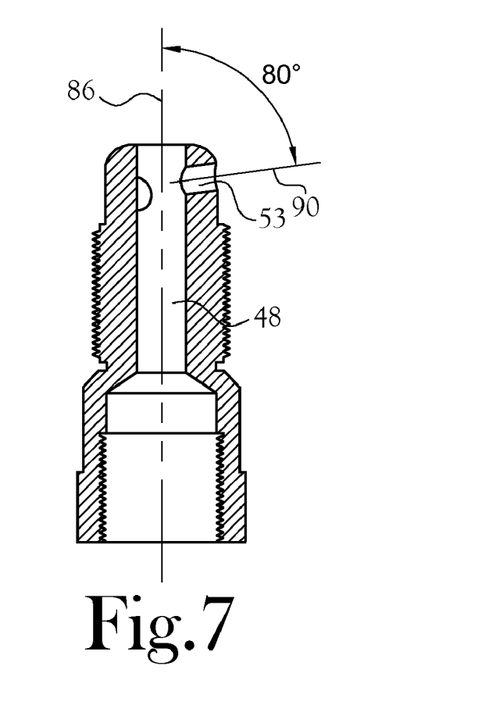
FIG. 7 is a further side elevation view, section, of the flame cone depicted in FIG. 4.
Figure 8:
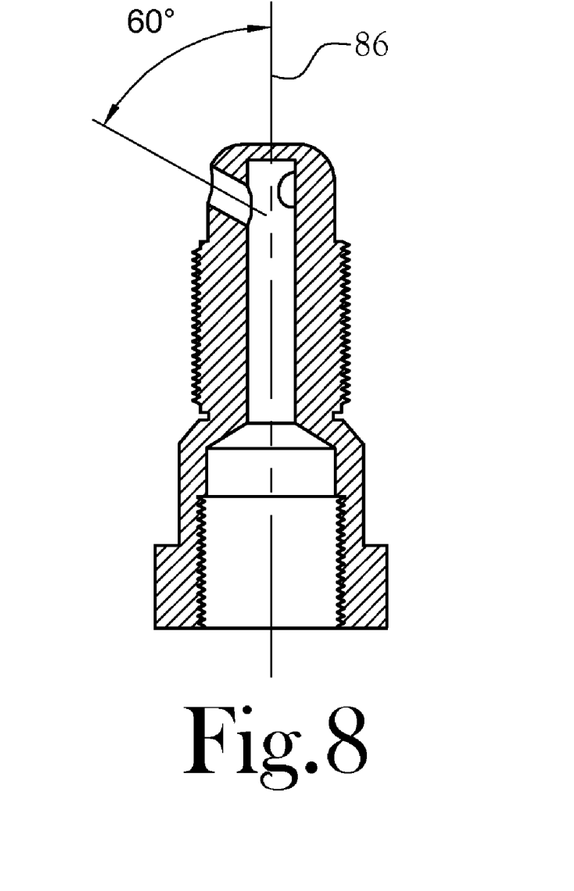
FIG. 8 is still further side elevation view, in section, of the flame cone depicted in FIG. 4.
Figure 9:
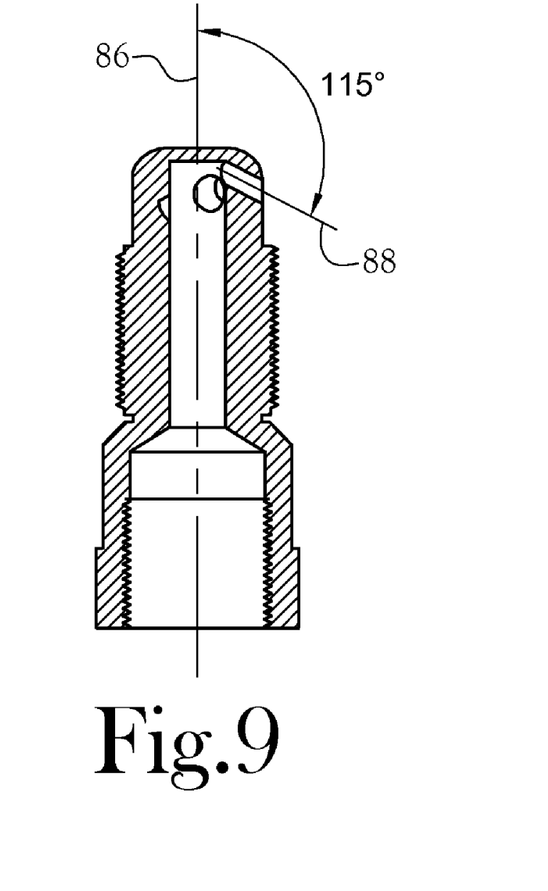
FIG. 9 is a still further side elevation view, in section, of the flame cone depicted in FIG. 4.
Figure 10:
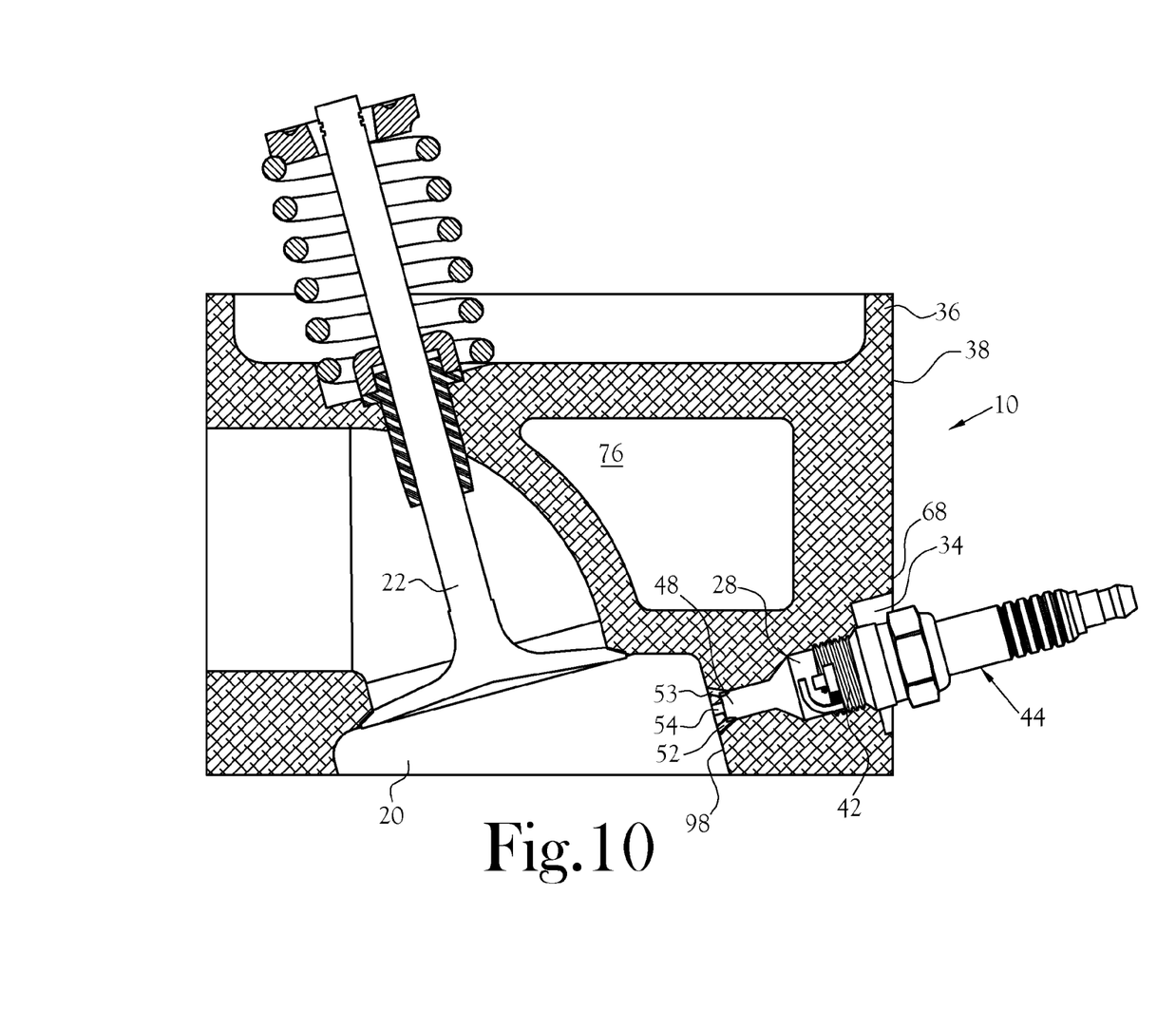
FIG. 10 is a schematic representation of a further embodiment of apparatus useful in the present invention without employing a flame cone.

The apparatus of the present invention is incorporated into the throughbore of an ICE from a position external of the combustion chamber of the ICE. No removal of the head of the ICE is required. After the present apparatus is in place, start up of the ICE and movement of the piston through its compression stroke, feeds fuel/air mixture primarily through the central channel into the pre-combustion chamber. Upon firing of the spark plug, ignition of the fuel/air mixture within the pre-combustion chamber is initiated, thereupon, a flame front which is of substantial size, promptly develops and propagates along the central channel. Referring to FIG. 3, proximate the inboard terminal end of the central channel, this flame front is divided into at least first and second, and preferentially third flame fronts 58, 60 and 61, respectively. A first portion 58 of the flame front exits the larger diameter central channel, hence is directed toward the intake valve where "fresh" fuel/air mixture is most likely to accumulate. A second portion of the flame front moving through the central channel exits through the at least one lateral channel. In the depicted embodiment, the first flame front exiting the central channel is of a greater size, but of a lesser velocity, than the size and velocity of the second flame front which exits the terminal end of the central channel via the at least one lateral channel. This central channel is directionally aligned with the location of the intake valve disposed within the combustion chamber. Upon the flame front from the central channel reaching the fresh fuel/air mixture in the vicinity of the intake valve, such mixture is thereupon rapidly ignited, creating a relatively large flame front which rapidly spreads within the combustion chamber, building up pressure and heat.

In this depicted embodiment, the at least one lateral channel which also exits the inboard terminal end of the flame cone into the combustion chamber, is directionally aligned with the location of the exhaust valve in the combustion chamber. As depicted in FIG. 3, the internal diameter of this at least one lateral channel is less than the internal diameter of the central channel, hence the flame front exiting this lateral channel exhibits a size less than the size of the flame front exiting the central channel, and a velocity which is greater than the velocity of the flame front exiting the central channel.

The inventors have found that, by reason of the proximity of the inboard terminal end of the central channel to the intake valve and the larger internal diameter of the central channel, relative to the radially lateral channel, a quantity of the incoming "fresh" fuel/air mixture within the combustion chamber during the compression stroke of the engine is preferentially conveyed from the combustion chamber into the pre-combustion chamber via the central channel. By this means, the quantity of fuel/air mixture drawn into the pre-combustion chamber in the course of the compression stroke of the engine includes relatively little, if any, residual unburned gas(es) from a preceding cycle of the engine which may not have been exhausted during such preceding engine cycle.

The second flame front 60 exiting the central channel simultaneously exits via the exit port 56 of the lateral channel which is directionally aligned with the exhaust valve in the combustion chamber. In an ICE, the hottest location within the combustion chamber aside from the spark plug electrode is proximate the exhaust valve. This factor is important in that the flame front developed proximate the intake valve by the present invention rapidly spreads within the combustion chamber including toward the exhaust valve. This fast combustion of the fuel/air mixture within the combustion chamber quickly develops large pressures and large quantities of heat which tend to promote detonation of the fuel/air mixture proximate the hot exhaust valve. Such rapid buildup of pressure and heat is desirable in that they enhance conversion of the combustion process to energy useful for driving the piston through its power stroke, ie. conversion of the energy associated with the high pressure and heat into work (driving the piston). It will be recognized that the buildup of pressure and heat and the concomitant energy associated with the pressure and heat, within the combustion chamber is anti-productive if such buildup takes place before the piston has passed TDC. Specifically, if the energy available due to the high pressure and heat buildup within the combustion chamber is imparted to the piston before the piston reaches TDC, such energy applied to the piston is transferred to the bearings which connect the piston rod to the crank shaft and resultant buildup of friction within such bearing (and potentially other elements of the drive train of the vehicle). Aside from the damage associated with such friction, the value of the energy is lost, commonly as heat to the radiator or other component of the vehicle. This loss of energy can materially reduce the overall efficiency of the combustion of the fuel/air mixture within the combustion chamber of the engine.

Additionally, as noted above, it has been found that the rapid propagation of the flame front emanating from the area of the intake valve and the concomitant buildup of pressure and heat near the exhaust valve tends to promote detonation at the hot exhaust valve. In accordance with one embodiment of the present invention, such detonation is avoided by forming the lateral channel which exits the inboard end of the central channel, of a smaller internal diameter than the internal diameter of the central channel and directing such flame front emanating from the lateral channel toward the exhaust valve of the ICE. The lateral channel, being of smaller internal diameter than the internal diameter of the central channel, projects a relatively fast forward moving flame front toward the exhaust valve, thereby ensuring that such flame front reaches the vicinity of the exhaust valve and initiates combustion of that fuel/air mixture disposed proximate the exhaust valve before the buildup of pressure and heat from the overall combustion of fuel/air mixture within the combustion chamber delivers its associated high pressure and heat to the vicinity of the exhaust valve and before molecular structure has time to cause detonation. This timing of arrival of the flame front issuing from the lateral channel of the flame core precedes or substantially coincides with the arrival of that flame front propagating outwardly from the vicinity of the intake valve. The forward propagation of the second flame front thus reaches and initiates combustion of the fuel air mixture proximate the exhaust valve before such fuel/air mixture can be detonated by the hot exhaust valve.

In addition to the elimination of "knocking" due to detonation of the fuel/air mixture in the vicinity of the exhaust valve, the "timed" delivery of separate flame fronts to selected regions within the combustion chamber aids in maximizing the conversion of the pressure and heat within the combustion chamber into work, namely, driving of the piston of the engine into and through its power stroke.

Figure 14:
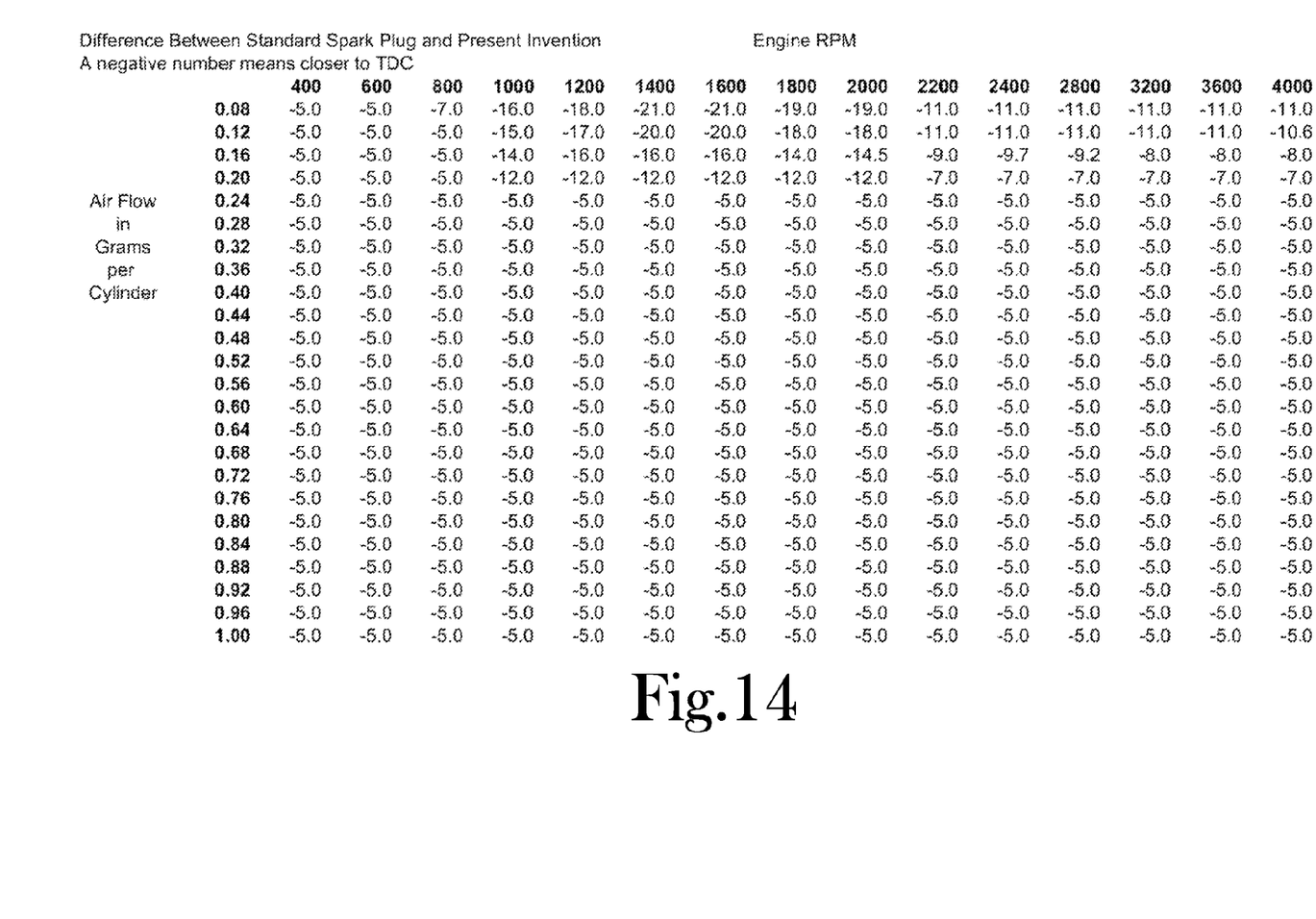

Timing (degrees before TDC of initiation of combustion within the combustion chamber of the engine) of the ignition of the A/F mixture within the combustion chamber of an ICE is related to the quantity of A/F mixture entering the engine over the entire spectrum of anticipated engine rotations per minute (rpm). An operational map of a given ICE is available from the manufacturer of the engine. FIG. 12 shows an operational map for a GM 5.3 liter engine, as an example of a "standard" (factory supplied ignition control system) (no flame front) engine controlled by an ECM. From FIG. 12, it will be seen that ignition of the A/F mixture within the combustion chamber of the engine is commenced at 18 degrees before TDC when the engine is idling at 400 rpm and with an infeed of 0.08 grams per cylinder of air flow into the combustion chamber. When the air flow into this same idling engine is increased to 0.64 grams per cylinder, the EOM commences the ignition of the A/F mixture at 8.5 degrees before TDC FIG. 13 shows the relationship of engine speed and air flow into the combustion chamber of the same engine equipped with a flame front pre-combustion system of the present invention. In this figure, it will be noted that when the engine employing the present invention is operating at 400 rpm with an air flow of 0.08 gram per minute, the commencement of the ignition of the A/F mixture within the combustion chamber is commenced at 13.0 degrees before TDC. This retardation of the commencement of the ignition of the A/F mixture by 5 degrees closer to TDC by means of the present invention has been found to enhance the efficiency of utilization of the A/F mixture by as much as 7% over the efficiency of utilization of the A/F mixture when employing a "standard" engine. The table presented in FIG. 14 depicts the ability of the present invention to retard the ignition of the A/F mixture within the combustion chamber by 5 or fewer degrees before TDC over about 300 of the 360 depicted possible combinations of grams per cylinder air flow for engine speeds ranging from idling to 4000 rpm. As noted, this factor provides for both enhanced efficiency of utilization of the A/F mixture at all engine speeds and an extended range of A/F in feeds to the combustion chamber of an ICE and concomitant elimination of most environmentally undesirable emissions (with the exception of nitrogen-bearing gasses which are readily extracted and rendered harmless by a conventional three-way catalyst).

In accordance with another aspect of the present invention, enhancement of the conversion of pressure and heat within the combustion chamber to work, i.e. driving the piston of the engine into and through its power stroke, is enhanced by selection of the timing of the commencement and scheme of propagation of the flame fronts from the pre-combustion chamber into and within the combustion chamber.

More specifically, in the preferred embodiment of the present invention, the activation of the spark plug for igniting the fuel/air mixture within the pre-combustion chamber is selected to occur approximately 5 degrees of crankshaft rotation later than the activation point used for standard spark plug systems wherein the electrode-bearing end of the spark plug is positioned internally of the combustion chamber. This retardation action moves the ignition commencement point approximately 5 degrees prior to TDC of the crankshaft (piston). This timing of the pre-combustion so near the TDC position of the crankshaft provides sufficient time for the spark plug to ignite the fuel/air mixture in the pre-combustion chamber, for the development of a flame front within the pre-combustion chamber, propagation of such flame front into and through the central channel and outwardly therefrom in divided individual flame fronts toward the intake valve and the exhaust valve before the crankshaft reaches TDC. The present invention thus provides concomitant optimum buildup of pressure and heat within the combustion chamber as near to, but not materially prior to, TDC as reasonably achievable without detonation. By this means, conversion of pressure and heat within the combustion chamber to energy for commencing movement of the piston of the engine into and through the engine power stroke is timed to retard material generation of pressure and heat buildup within the combustion chamber before the crankshaft rotation achieves TDC but with maximization of the rate of buildup of pressure and heat within the combustion chamber once the crankshaft has achieved TDC and the piston is ready to be driven into and through its power stroke. Such control over the propagation of the flame fronts toward the intake valve and the exhaust valve of the ICE maximizes the efficiency of operation of the ICE, i.e., maximization of combustion of the fuel/air mixture injected into the combustion chamber, hence enhanced correlation of the burning of the fuel/air mixture within the combustion chamber and the timely conversion of such burning action into energy for driving the ICE, as opposed to the conversion of pressure and heat within the combustion chamber to energy at a time prior to the piston reaching TCD. As noted, in the situation where the maximization of the pressure and heat (energy available for work) within the combustion chamber occurs at a time when the piston nears the completion of its compression stroke and is not yet positioned at TDC, the application of work against the piston is more than wasted. More specifically, such energy acts to counter the movement of the piston toward its TDC position between its compression and power strokes with concomitant friction between the piston rod and the crankshaft (and other components of the engine) and/or dissipation of the such energy to the cooling system of the engine and/or various components of the engine.

In a preferred embodiment of the present invention, continued burn of the fuel/air mixture within the combustion chamber and the accompanying generation of energy within the combustion chamber provide energy needed to move the piston through its power stroke. In the present invention, this continued burn is in part contributed to by a further (second) lateral channel 53 leading from the central channel into the combustion chamber via an exit port 93. This further lateral channel emits a flame front 61 therefrom into the combustion chamber in a direction which is generally tangential to the inner circumferential wall of the combustion chamber. This flame front, being directed to those regions within the combustion chamber where fuel/air mixture may accumulate or reside along the outer borders of the flame fronts associated with the ignition occasioned by the flame fronts of the central channel and that lateral channel which is directed toward the exhaust valve, enhances maximization of the combustion of the fuel/air mixture entering the combustion chamber through the intake valve during a given cycle of the engine, including unburned fuel/air mixture which may be accumulated about the circumferential inner wall of the combustion chamber. This additional contribution to the overall burning of the fuel/air mixture within the combustion chamber adds to the overall total pressure and heat buildup within the combustion chamber during a given cycle of the engine, and especially enhancement of potential energy available for work in the form of movement of the piston through its power stroke.

For example, in the embodiment depicted in FIGS. 4-10, the further (third) portion of the flame front 61 exits the central channel via a further lateral channel 53 which is directionally aligned along a path which does not intersect nor interfere with the propagation of the flame fronts aimed toward the intake and exhaust valves. Commonly, this third flame front may be directed generally along a tangent to the inner circumferential wall of the combustion chamber to reduce the wall impingement effect (where incoming fuel/air mixture is swept by centrifugal forces onto the circumferential inner wall of the combustion chamber) and/or to "sweep" fuel air mixture from such areas into the remainder of the combusting fuel/air mixture. It is not known for certain to what extent this "wall sweeping" action enhances the efficiency of combustion of the fuel/air mixture disposed within the combustion chamber, but experience has demonstrated that, as described herein, the combination of three exits ports from the central channel leading from the pre-combustion channel into the combustion chamber, may afford material enhancement of the efficiency of operation of the ICE by as much as 10% and a material reduction in many of the undesirable environmentally detrimental gases heretofore known to be produced in the exhaust emissions of ICEs. Whereas nitrogen-containing gases (NOx) have been observed in the exhaust emissions of ICEs equipped with the present invention, such gases are readily extracted from the exhaust emissions employing well known catalytic measures.

Accordingly, one embodiment of the method of the present invention includes the steps of (a) providing a fuel/air mixture useful for combustion within the combustion chamber of an ICE which includes a cylinder, a piston reciprocatably mounted within said cylinder, and a crankshaft operatively associated with the piston, (b) externally of the combustion chamber, providing a pre-combustion chamber having a first channel of a first internal diameter in fluid flow communication between the pre-combustion chamber and the combustion chamber and aligned with the location of an intake valve within the combustion chamber, and at least one channel extending from the central channel into the combustion chamber and aligned with the location of an exhaust valve within the combustion chamber, (c) introducing a quantity of the fuel/air mixture into the combustion chamber, (d) transferring a quantity of fuel/air mixture from the combustion chamber into the pre-combustion chamber, (e) igniting the quantity of fuel/air mixture within the pre-combustion chamber to develop a flame front which propagates along the central channel toward the combustion chamber, (f) dividing the flame front within the central channel into at least two separate flame fronts, one of which exits the central channel and enters the combustion chamber in the direction of the intake valve in the combustion chamber, (g) directing another of the separate flame fronts from the central channel into the combustion chamber in the direction of the exhaust valve in the combustion chamber, and (h) timing the initiation of combustion of said quantity of fuel/air mixture within the pre-combustion chamber to commence when the crankshaft associated with the piston is operatively within about 5 degrees before TDC.

Figure 11:
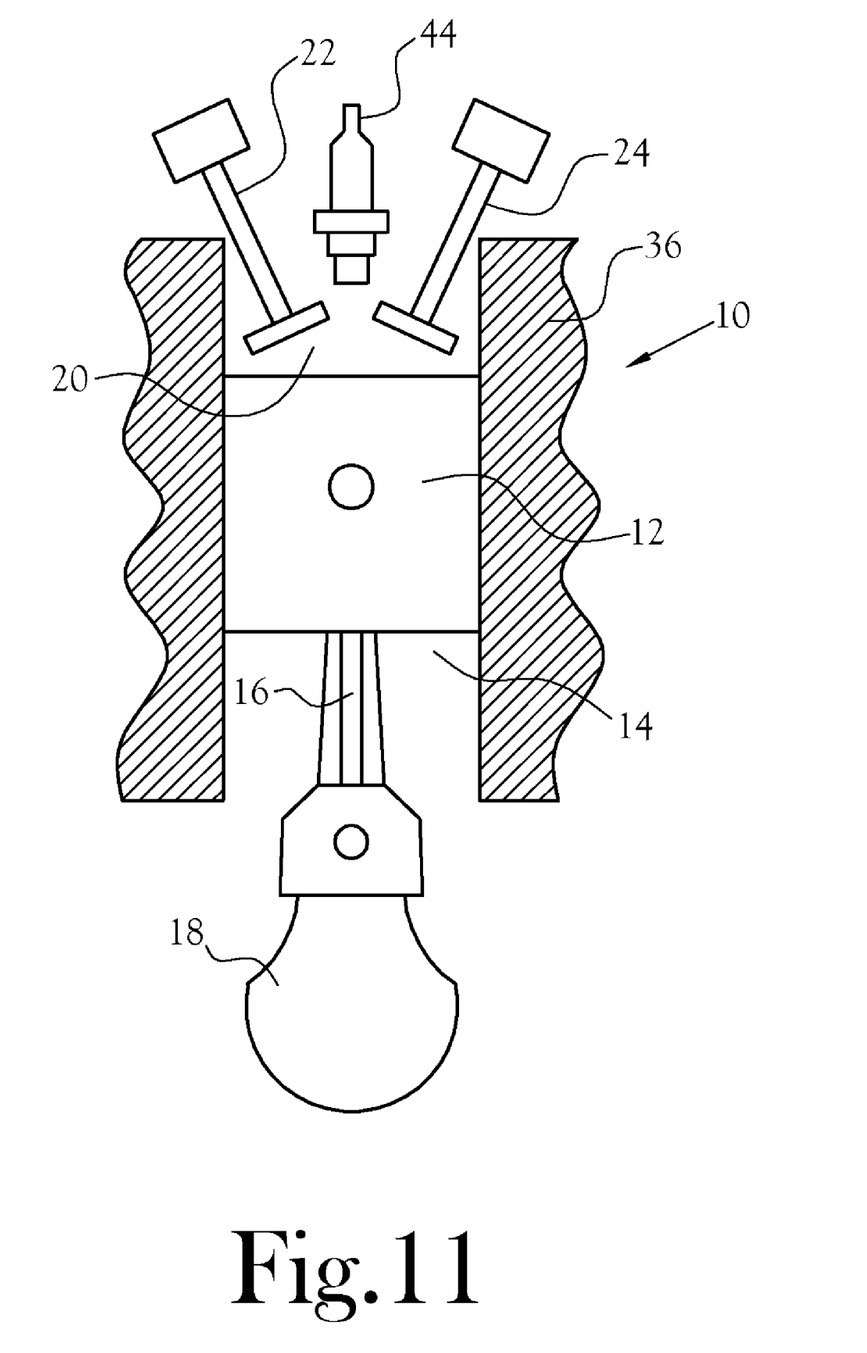
FIG. 11 is a schematic representation of a portion of a conventional ICE.

In one embodiment of the present invention, as depicted in FIG. 11, there is defined (such as by casting, machining or other forming means) a throughbore 34 through the wall 36 of the head 38, such throughbore extending from the outer wall 68 of the head to a terminal location proximate the combustion chamber 20 of the ICE. At this terminal location 98, the inner wall of the head is provided with a plurality of exit ports 52, 53 and 54 including a plurality of lateral channels which extend generally radially from a central channel 48, to provide for division and distribution of a flame front moving through the central channel toward the combustion chamber into a plurality of spaced apart flame fronts as described hereinabove. No flame cone is employed in this embodiment.

In the embodiment depicted in FIG. 11, that end of the throughbore adjacent the outer wall of the head is internally threaded to receive therein the threaded end of a conventional spark plug 44. The extent of insertion of the spark plug is limited by a circumferential shoulder 100 in the throughbore such that the electrode of the spark plug is disposed approximately midway between the inner and outer walls of the head and fully within the throughbore. At a location intermediate the inboard and outboard ends of the throughbore, the internal diameter of the throughbore is reduced, thereby defining a pre-combustion chamber 28 proximate the midpoint of the length dimension of the throughbore. Again, this positioning of the pre-combustion chamber is sufficiently proximate to the existing cooling channel 76 or channels of the ICE as to preclude inordinate buildup of heat and possible pre-ignition of any fuel/air mixture entering or resident within the pre-combustion chamber and/or the central channel.

In a still further embodiment of the present invention, the flame cone and the spark plug may be either manufactured as a unitary module or may be permanently joined to one another in the area of their respective adjacent ends. Among other things, this embodiment may permit use of the existing hex-sided body portion of the conventional spark plug as the location for application of a tool for rotationally inserting the unitary module within the throughbore. It will be recognized by one skilled in the art that the formation of the throughbore and the ignition chamber, and at least a portion or potentially all of the channels associated with the transfer of the initial flame front from the pre-combustion chamber to the combustion chamber, also may be by means of a casting of the engine head.

As noted, in the embodiment depicted in FIG. 11, there is no flame cone involved, per se. Rather, the throughbore is cast or machined as an integral part of the head, including variations in diameters of different portions of the throughbore and/or internal threads for that end of the throughbore which receives a spark plug therein.

Whereas there is described herein one embodiment of an ICE combustion chamber of a given geometry, it will be recognized that the present invention is not limited to a particular geometry of the combustion chamber. In some ICEs, the intake valve is located at a location within the combustion chamber whereby the flame front exiting the central channel will need to be angled toward the intake valve as opposed to the flame front exiting the central channel along a straight path coincident with the longitudinal centerline of the central channel. Likewise, the location of the exhaust valve may be altered from that shown in figures. In any event, the path of the flame front exiting the central channel is to be aligned such that the flame front assumes a direct path from its exit port from the central channel to its intended operative destination. In other embodiments of a combustion chamber, the distances between the intake valve and the exhaust valve may vary. In such embodiments, consideration must be take of the need for propagation of the combustion within the combustion chamber to follow the pattern set forth herein in order to achieve maximization of the buildup of heat and pressure within the combustion chamber at the herein described timing with respect to the rotational position of the crankshaft, for achieving the described advantages of energy conversion to work for driving the piston within its cylinder.

Similarly, whereas that channel in the flame cone leading directly from the pre-combustion chamber to the combustion chamber is referred to herein as a "central" or "first central" channel, it will be recognized that this first central channel need not be "central" of the flame cone (i.e., its longitudinal centerline may be offset from the longitudinal centerline of the flame cone).

What is claimed is:

1. A method for enhancement of the conversion of pressure and heat associated with the combustion process of a air/fuel mixture disposed within a combustion chamber of an ICE having an intake valve and an exhaust valve housed therewithin comprising the steps of;

introducing a quantity of air/fuel mixture into the combustion chamber, transferring a portion of said quantity of air/fuel mixture into a pre-ignition chamber disposed externally of the combustion chamber and in fluid communication with the combustion chamber through at least a central channel and a lateral channel, igniting said air/fuel mixture within the pre-ignition chamber to thereby generate a flame front which propagates from said pre-ignition chamber into said central channel, prior to the exit of said flame front from said central channel into said combustion chamber, diverting a portion of said flame front into said lateral channel, directing said diverted portion of said flame front into said combustion chamber via a first exit port from said lateral channel in a direction aligned with the location of the intake valve at a first velocity, and directing a second individual flame front exiting said central channel via a second exit port in a direction aligned with the location of the exhaust value at a second velocity which is greater than said first velocity, whereby said first and second flame fronts effect ignition of air/fuel mixture in the respective vicinities of the intake and exhaust valves, said second flame front being delivered to and commencing ignition of air/fuel mixture in the vicinity of the exhaust valve at a time prior to the buildup of pressure and heat within the combustion chamber in proximity to the exhaust valve due to the ignition effected by said first flame front in the vicinity of the intake valve building up pressure and heat sufficient to effect detonation of air/fuel mixture in the vicinity of the exhaust valve, said pre-combustion of said portion of said air/fuel mixture within said pre-ignition chamber being effected at a time within the cycle of the ICE wherein the rotational position of the crankshaft, hence the piston associated with the combustion chamber, achieves a position not in excess of about five degrees prior to top dead center, thereby maximizing the buildup of pressure and heat within the combustion chamber, without detonation, at a time which is most advantageous for conversion of such pressure and heat to energy for driving the piston into and through its power stroke.

2. The method of claim 1 wherein combustion of said air/fuel mixture within the combustion chamber, without detonation, continues through at least five degrees of rotation of the crankshaft.

3. The method of claim 2 wherein combustion of said air/fuel mixture within the combustion chamber, without detonation, continues past top dead center of the crankshaft rotation.

4. The method of claim 3 wherein combustion of said air/fuel mixture within the combustion chamber, without detonation, continues past TDC and at least partially through the power stroke of the crankshaft rotation.

5. A method for enhancement of the efficiency of operation of an ICE having a combustion chamber housing therein at least an intake valve and an exhaust valve, comprising the steps of providing a pre-combustion system in association with the combustion chamber, the system including a pre-combustion chamber externally of the combustion chamber and in fluid communication with the combustion chamber through a first channel having at least first and second exit ports providing fluid communication between the first channel and the combustion chamber, introducing a quantity of air/fuel mixture into the combustion chamber through the intake valve in the course of the intake stroke of the ICE, a portion of said quantity of air/fuel mixture entering said pre-combustion chamber via said first channel, igniting said quantity of air/fuel mixture disposed within said pre-combustion chamber thereby generating an initial flame front which propagates into and along said first channel toward the combustion chamber;

prior to said initial flame front exiting said central channel, dividing said flame front into at least first and second individual flame fronts which are individually directed into the combustion chamber, one of said at least first and second individual flame fronts, substantially simultaneously directing said first individual flame front toward the intake valve and directing said second individual flame front toward said exhaust valve, whereby said flame fronts individually act to ignite air/fuel mixture resident adjacent the intake valve and air/fuel mixture resident adjacent the exhaust valve, and concomitant generation of a flame front propagating away from the intake valve with accompanying buildup of pressure and heat within the combustion chamber, and ignition of air/fuel mixture resident adjacent the exhaust valve at a time sufficiently in advance of the buildup of pressure and heat within the combustion chamber capable of detonation of air/fuel mixture adjacent the exhaust valve and including the step of activation of ignition of said air/fuel mixture disposed within said pre-combustion chamber at a time when the rotational position of the crankshaft of the engine is about 5 degrees from top dead center of the crankshaft during the compression stroke of the piston.

6. The method of claim 5 wherein said timing of the activation of ignition of said air/fuel mixture within said pre-combustion chamber is commenced when the rotational position of the crankshaft of the engine is about 5 degrees later than the time of activation of ignition of the air/fuel mixture within the pre-combustion chamber established by an operational map developed specifically for the engine in question.

7. The method of claim 6 wherein said operation map comprises pre-TDC positions of the crankshaft of the engine derived from the physical and geometrical features of the engine over an anticipated range of operational speeds of the engine and an anticipated range of corresponding air flow rates into the combustion chamber of the engine via the intake valve of the engine.

8. The method of claim 7 wherein the timing of ignition of the air/fuel mixture within the pre-combustion chamber is selected to be later than the timing of ignition of the air/fuel mixture based upon said operational map developed specifically for such engine.

9. The method of claim 7 wherein said timing of ignition is about 5 degrees later than the pre-TDC timing of ignition of the air/fuel mixture based upon said operation map developed specifically for such engine based upon preselected air flow rates of a air/fuel mixture entering the combustion chamber per cycle of the engine at each of a range of anticipated operating speeds of the engine from idle speed to normal anticipated open road operating speeds of the engine.

10. A method for enhancement of the efficiency of operation of an ICE having a combustion chamber housing therein at least an intake valve and an exhaust valve, comprising the steps of providing a pre-combustion system in association with the combustion chamber, the system including a pre-combustion chamber externally of the combustion chamber and in fluid communication with the combustion chamber through a first channel having at least first and second exit ports providing fluid communication between the first channel and the combustion chamber, introducing a quantity of a air/fuel mixture into the combustion chamber through the intake valve stroke of the ICE, a portion of said quantity of air/fuel mixture entering said pre-combustion chamber via said first channel, igniting said quantity of air/fuel mixture disposed within said pre-combustion chamber thereby generating an initial flame front which propagates into and along said first channel toward the combustion chamber, prior to said initial flame front exiting said first channel, dividing said flame front into at least first and second individual flame fronts which are individually directed into the combustion chamber, said first individual flame front being directed toward the intake valve and said second individual flame front being directed toward the exhaust valve, whereby said flame fronts individually act to ignite air/fuel mixture resident adjacent the intake valve and air/fuel mixture resident adjacent the exhaust valve, respectively, timing the commencement of ignition of the air/fuel mixture within the pre-combustion chamber at a time which is later than the timing of the commencement of ignition of the air/fuel mixture set forth as an operation map which is developed via testing for the minimum spark advance for best torque output for the engine over a range of operating speeds for the engine employing a corresponding range of air flow rates of a stoichiometric air/fuel mixture into the combustion chamber of the engine.

11. The method of claim 9 wherein said timing the commencement of ignition of the air/fuel mixture within the pre-combustion chamber is programmed into the EOM of the engine in lieu of the program providing for earlier timing of the commencement of ignition of the air/fuel mixture within the pre-combustion chamber.

12. The method of claim 9 wherein said later commencement of ignition of the air/fuel mixture within the pre-combustion chamber is about 5 degrees nearer to TDC of the crankshaft of the engine.

* * * * *